United States Patent [19]

Torii

[11] 3,996,183

[45] Dec. 7, 1976

[54] SOLID PASTE AND METHOD OF MAKING SAME

[75] Inventor: Shiro Torii, Tokyo, Japan

[73] Assignee: Ogawa Chemical Industries, Ltd., Japan

[22] Filed: Oct. 3, 1975

[21] Appl. No.: 619,458

Related U.S. Application Data

[63] Continuation of Ser. No. 434,409, Jan. 18, 1974, abandoned, Continuation-in-part of Ser. No. 264,826, June 21, 1972, abandoned.

[30] Foreign Application Priority Data

Feb. 21, 1972 Japan .............................. 47-17951

[52] U.S. Cl. .................. 260/29.6 HN; 260/29.6 B; 260/33.4 R; 428/500
[51] Int. Cl.$^2$ .................. C08L 29/04; C08L 39/06
[58] Field of Search .............. 260/29.6 HN, 29.6 B, 260/29.6 NR, 33.4 R

[56] References Cited

UNITED STATES PATENTS

| 2,658,045 | 11/1953 | Schildknecht | 260/29.6 HN |
| 3,071,513 | 1/1963 | DeBoer et al. | 424/14 X |
| 3,504,746 | 4/1970 | Freifeld et al. | 260/29.6 HN X |

FOREIGN PATENTS OR APPLICATIONS 2,204,482  8/1972  Germany

OTHER PUBLICATIONS

Hamada et al., Chemical Abstracts, vol. 78:161,147$d$ (1973).

*Primary Examiner*—Murray Tillman
*Assistant Examiner*—W. C. Danison, Jr.
*Attorney, Agent, or Firm*—McGlew and Tuttle

[57] ABSTRACT

Solid paste composition is formed by the steps of (a) mixing the ingredients of a water soluble or water miscible paste component with the same solvent alone or with its mixture with water, (b) adding further ingredients consisting of (i) the condensate of sorbite and benzaldehyde as forming agent, and (ii) alkyl-pyrrolidone as solution accelerator for the gel forming agent, (c) dissolving the aforesaid ingredients by uniformly heating and stirring, and (d) solidifying said ingredients by pouring into a given mold, cooling and recovering the so-obtained solid paste composition.

11 Claims, No Drawings

SOLID PASTE AND METHOD OF MAKING SAME

CROSS-REFERENCE TO PRIOR APPLICATION

This application is a continuation of application Ser. No. 434,409 filed Jan. 18, 1974, now abandoned, which in turn is a continuation-in-part of Application Ser. No. 264,826, filed on June 21, 1972, now abandoned.

BACKGROUND OF THE INVENTION

1. Field of the Invention

The present invention relates to the forming of solid paste by using the condensate of a polyalcohol, such as sorbite, and benzaldehyde as gel forming agent. The solution accelerator for said agent and, in particular, for the solid paste, is formed efficiently in the shortest possible time. In consideration of the fact that the accelerator has a great effect on the quality of products or manufacturing process, the solution accelerator is used which shows greatly high workability when used alone or with dimethylformamide.

2. The Prior Art

The prior art reference U.S. Pat. No. 2,658,045 is characterized in that polyvinyl pyrrolidone (P.V.P.) is treated and gelled by persulfate. That is, the P.V.P. is used as a gelling agent in the prior art reference. In the present invention, however, the condensate of sorbitol and benzaldehyde is employed as a gelling agent and a sufficient solidity can be given to this gelling agent without using the P.V.P. After all, the P.V.P. is used only as an adhesive in this invention. Besides, the present invention finds it unnecessary to use watermiscible persulfate in forming gelling agents.

In prior art U.S. Pat. No. 3,071,513, several kinds of solvent and adhesive are mixed to seal a capsule while a mixture of components similar to the said U.S. Pat. No. 3,071,513 is used to adhere paper, cloth, lumber and the like in the present invention. Thus, the present invention completely differs in purpose and content from this patent.

Prior art U.S. Pat. No. 3,504,746 is characterized in that the P.V.P. is treated and gelled by a redox catalyst of reducing agent or peroxide or both mixed. That is, the P.V.P. is used as a gelling agent in U.S. Pat. No. 3,504,746.

In the present invention, however, the condensate of sorbitol and benzaldehyde is employed as a gelling agent and a sufficient solidity can be given to this gelling agent without using the P.V.P.

After all, the P.V.P. is used only as an adhesive in this invention, and this invention finds it unnecessary to use a redox catalyst of reducing agent and peroxide in forming gelling agents. Thus, the present composition invention is neither suggested nor taught by this prior art nor by any of the other prior art, either alone or in combination. Only the use of the P.V.P. is common to the present invention and and the prior art inventions. The P.V.P. of the present invention is mixed for the purpose completely different from that of the prior art. In other words, P.V.P. is employed only as an adhesive in the present invention. Moreover, none of the reducing agents, peroxides or persulfates, which are main components of the prior art, are used in the present invention.

SUMMARY OF THE INVENTION

According to the present invention, polyvinylpyrrolidone or the water dispersive copolymer of vinyl acetate and vinylpyrrolidone or the like, and a lower alkanol such as isopropyl alcohol, ethanol, or the like, are used as known water soluble or miscible paste component and solvent component, respectively, of a solid paste composition. The above-mentioned condensate of sorbite and benzaldehyde is used as a gell forming agent, and a solution accelerator is properly chosen and used for the dissolving of the gel forming agent, for example, alkylpyrrolidones, such as methylpyrrolidone, ethylpyrrolidone, N-methyl-2-pyrrolidone, N-methylpyrrolidone, N-propyl-2-pyrrolidone. Lower alkylpyrrolidones are preferred. The condensate of sorbite and benzaldehyde is prepared according to the following method, which is described hereinbelow.

Furthermore, polyvinyl alcohol and ethyl alcohol may be used as said paste component and solvent component, respectively.

The various ingredients of the solid paste composition of the invention are described as follows.

Polyvinylpyrrolidone: its molecular weight, structural formula and physical properties are as follows:
i. molecular weight: 10,000 - 400,000
ii. formula:

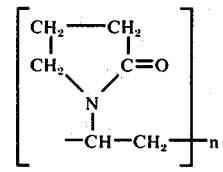

iii. physical properties are well known.
Properties: forms hard, transparent, lustrous films. Binds, stabilizes many organic and inorganic Detoxifies detoxifies a wide variety of irritants. Protects, stabilizes suspensions, dispersions, emulsions. Prevents soil redeposition. Precipitates tannins. Physiologically compatible. Adherent to hair, smooth surfaces. Soluble in water, alcohols, some chlorinated solvents, nitroparaffins, amines.

Copolymer: its molecular weight, structural formula and physical properties:
i. Molecular weight: 10,000 - 400,000
ii. Formula
polyvinylpyrrolidone

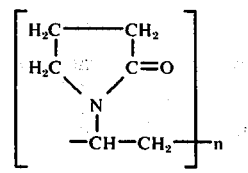

water-dispersive vinylacetate

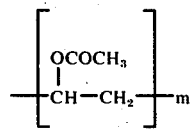

iii. Physical properties:
Form adhesive, glossy, water-removable films (water sensitivity increases with vinylpyrrolidone content). Compatibility with many modifiers and plasticizers permits various degrees of hygroscopicity, flexibility, abrasion resistance. Diverse physical forms offer a broad range of compatibility with aqueous and organic solvent systems. Polyvinyl alcohol: its molecular weight and structural formula:

i. Molecular weight: 10.000 – 300,000
ii. formula:

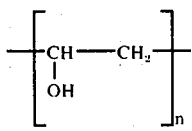

As gelling agent, benzylidene sorbitol (the condensate of benzaldehyde and sorbite) is employed and prepared from benzaldehyde and sorbite

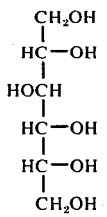

Other aldehydes cannot be used, except Xylitol, which however, can be used in place of sorbite. Its structure is as follows:

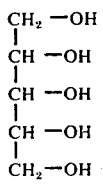

The structure of the aforementioned condensate is as follows:

Di-Benzylidene sorbitol:

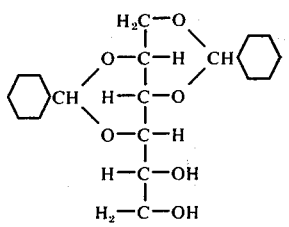

and
Tri-benzylidene sorbitol:

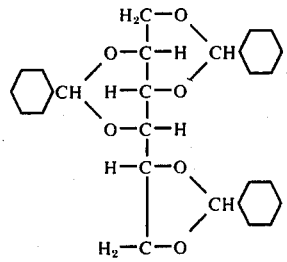

As solution accelerator alkylpyrrolidone is used, especially, N-methyl-2-pyrrolidone.

DESCRIPTION OF SPECIFIC EMBODIMENTS

The Examples which are meant to illustrate the invention are shown below. Unless otherwise stated herein, all parts are parts by weight, and the relationship of parts by weight to parts by volume is as that of grams to cubic centimeters. Temperatures are in degrees centigrade.

EXAMPLE 1

| Ingredients | |
|---|---|
| Polyvinyl pyrrolidone | 15 parts |
| Isopropyl alcohol | 40 parts |
| Condensate of Sorbite and Benzaldehyde | 3 parts |
| Methylpyrrolidone | 5 parts |

A heater equipped with a stirrer is filled up with the foregoing mixture of ingredients, which are heated at a temperature of about 80° C and the resulting solution is stirred for about an hour under reflux. Immediately after this, the above mixture of ingredients is poured into a given mold, and left to cool for about a half hour at room temperature. As a result, the ingredients are solidified into the predetermined solid paste.

The given mold used in this example is a die, shaped in a cylindrical form, and the solid paste product has a cylindrical shape.

With the solid paste thus produced, paper of fine quality has been sealed perfectly in ten minutes.

EXAMPLE 2

| Ingredients | |
|---|---|
| Water dispersive Copolymer of vinyl acetate and vinyl pyrrolodone | 15 parts |
| Water | 20 parts |
| Ethanol | 20 parts |
| Condensate of Sorbite and Benzaldehyde | 2 parts |
| Methyl pyrrolidone | 5 parts |

The solid paste of this blending of the foregoing ingredients has been made in the same manner as in Example 1. The solid paste is used on paper of fine quality. The same result as that of Example 1 has been observed.

Examples of Vinylpyrrolidone / vinyl acetate copolymer are, for instance,
polyvinylpyrrolidone / vinyl acetate S-60

| | | |
|---|---|---|
| { vinylpyrrolidone | | 60% |
| vinyl acetate | | 40% |

(made by General Aniline & Film Corp.) LUBYSCOL VA 64

LUBYSCOL VA 64
| | | |
|---|---|---|
| { vinlypyrrolidone | | 60% |
| vinyl acetate | | 40% |

(made by Badische Aniline & Soda-Fabrik A.G.)

Alkylpyrrolidone including the solution accelerator used in these Examples 1 and 2 has a high solubility for said gel-forming agent used in this invention, and its amount to be used can be minimized. Thus, since the solution accelerator does not have a good adhering quality, for it is hard to boil and dry, it is often desirable to cut down or minimize the quantity of solution accelerator which is used.

In view of the present invention, the gel-forming agent and alkylpyrrolidone as a solution accelerator for said agent are mixed, and uniformly heated and stirred, and they are poured into the given mold and cooled to be solidified into the solid paste. Accordingly, the solution accelerator for the gelling agent can show its efficiency to perfection.

Thus, solubility of the gel-forming agent can be made extremely high, and the agent can uniformly be dissolved. The solid paste having suitable solidity can be attained with only a small quantity of the solution accelerator.

When using alkylpyrrolidone or methylpyrrolidone, especially as a solution accelerator, the dissolving force is twice that of dimethyl formamide (DMF). In the present case, therefore, the solution accelerator can be reduced to half the quantity when DMF is used. It is also desirable to use the solution accelerator in as little quantity as possible for finishing adhesion quickly, since the accelerator is slow to dry.

The preferred ratio in the solid paste composition is as follows:

| Polyvinyl pyrrolidone<br>Vinyl pyrrolidone/<br>vinyl acetate | Preferred Range of Components | Best (Most Preferred Range of Components |
|---|---|---|
| (Paste miscible with water) | 10 to 40 parts | 10 to 20 parts |
| Solvent | 35 to 70 parts | 35 to 50 parts |
| Gel-forming agent | 1 to 10 parts | 2 to 5 parts |
| Solution accelerator | 2 to 15 parts | 3 to 8 parts |

In addition, the present invention makes it possible to keep out an offensive smell of dimethylformamide and shorten drying hours in sealing. After all, this invention has high workability due to the use of the solution accelerator having an extremely high solubility and water dispersive copolymer of vinylacetate and vinylpyrrolidone and can achieve the expected objective of efficiently producing the solid paste in the shortest possible time.

In the foregoing examples, the molecular weight ratio of D-sorbite and benzaldehyde is 1:2 in preparation of the condensate thereof. The condensate is prepared as follows. Two gram molecules of benzaldehyde are added to one gram molecule of D-sorbite and stirred at room temperature with a small quantity of 60% (Volume) sulphuric acid, resulting in a paste-like, white-colored substance.

This substance is washed in water to remove non-reactive benzaldehyde therefrom and then extracted with ether; the resulting substance is washed once again in water, as before, and extracted with ether, and then the ether extract is evaporated to dryness to yield a white-colored, powdered condensate, with the formula as follows:

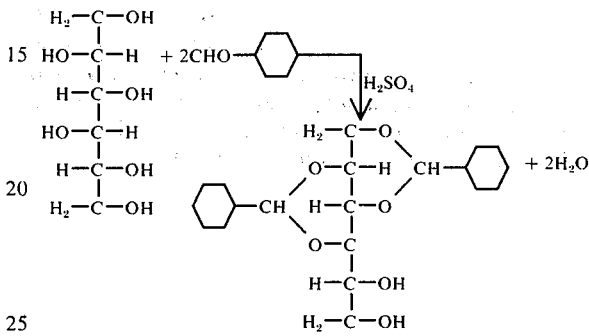

Condensate: Di-benzylidene sorbitol.

The condensate of one-molecule of D-sorbite and two-molecules of benzaldehyde is the most effective for gel-forming, and thus, it is most desirable to use a substance which contains this type condensate in as high purity as possible.

Characteristics of pure condensates are:

White-colored powder and non-resin

While specific embodiments of the invention have been shown and described in detail to illustrate the application of the principles of the invention, it will be understood that the invention may be embodied otherwise without departing from such principals.

What is claimed is:

1. Solid paste composition which consisting essentially from about 10 to about 40 parts by weight of a paste component miscible with water consisting essentially of a member selected from the group consisting of polyvinyl alcohol, and copolymer of a water dispersive about 40%, vinyl acetate and about 60% vinylpyrrolidone; from about 35 to about 70 parts by weight of a solvent component consisting essentially of lower alkanol; from about 1 to about 10 parts by weight of a gel forming agent consisting essentially of a condensate of sorbite and benzaldehyde; and from about 2 to about 15 parts be weight of a solution accelerator consisting essentially of alkylpyrrolidone for said gel forming agent.

2. Solid paste composition, according to claim 1, wherein said alkylpyrrolidone is selected from the group consisting to methylpyrrolidone, ethylpyrrolidone, N-methyl-2-pyrrolidone, N-methyl-pyrrolidone, and N-propyl-2-pyrrolidone.

3. Solid paste composition, according to claim 1, wherein said paste component is a member selected from the group consisting of polyvinylpyrrolidone, polyvinyl alcohol, and water dispersive copolymer of vinyl acetate and vinyl pyrrolidone; said solvent component consisting essentially of lower alkanol; and said solution accelerator is a member selected from the group consisting of methylpyrrolidone, ethyl-pyrrolidone, N-methyl-2-pyrrolidone, N-methyl-pyrrolidone, and N-propyl-2-pyrrolidone.

4. Solid paste composition according to claim 3, wherein the paste component comprises polyvinyl pyrrolidone, the solvent component consists essentially of isopropyl alcohol, and the solution accelerator consists essentially of methyl pyrrolidone.

5. Solid paste composition, according to claim 3, wherein the paste component consists essentially of a water dispersive copolymer of vinylacetate and vinyl pyrrolidone, and the solvent component comprises a lower alkanol.

6. Solid paste composition, according to claim 3, wherein the paste component consists essentially of about 15 parts polyvinyl pyrrolidone, about 40 parts isopropyl alcohol, about 3 parts condensate of sorbite and benzaldehyde, and about 5 parts methyl pyrrolidone, all of said parts being by weight.

7. Solid paste composition according to claim 3, wherein the paste component consists essentially of about 15 parts of a water dispersive copolymer of vinyl acetate and vinyl pyrrolidone, about 20 parts water, about 20 parts ethanol, about 2 parts condensate of sorbite and benzaldehyde, and about 5 parts methyl pyrrolidone, all of said parts being by weight.

8. Solid paste composition according to claim 1, wherein said paste component is present in the range of from about 10 to 20 parts by weight.

9. Solid paste composition according to claim 1, wherein said solvent is present in an amount of from about 35 to 50 parts by weight.

10. Solid paste composition according to claim 1, wherein said gel forming agent is present in an amount of from about 2 to 5 parts by weight.

11. Solid paste composition according to claim 1, wherein said solution accelerator is present in an amount of from about 3 to about 8 parts by weight.

* * * * *